United States Patent
Hell

(10) Patent No.: US 11,614,379 B2
(45) Date of Patent: Mar. 28, 2023

(54) ELECTRIC MOTOR FOR A DRIVE UNIT OF A DRIVE TRAIN TEST BENCH

(71) Applicant: ZF Friedrichshafen AG, Friedrichshafen (DE)

(72) Inventor: Christian Hell, Untergriesbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 818 days.

(21) Appl. No.: 16/465,263

(22) PCT Filed: Nov. 8, 2017

(86) PCT No.: PCT/EP2017/078529
§ 371 (c)(1),
(2) Date: May 30, 2019

(87) PCT Pub. No.: WO2018/103980
PCT Pub. Date: Jun. 14, 2018

(65) Prior Publication Data
US 2019/0391042 A1    Dec. 26, 2019

(30) Foreign Application Priority Data
Dec. 5, 2016    (DE) .................. 10 2016 224 138.9

(51) Int. Cl.
*G01M 13/02* (2019.01)
*H02K 5/16* (2006.01)
(Continued)

(52) U.S. Cl.
CPC .......... *G01M 13/025* (2013.01); *F16C 37/00* (2013.01); *H02K 5/16* (2013.01); *H02K 5/24* (2013.01); *F16C 2380/26* (2013.01)

(58) Field of Classification Search
CPC ............ H02K 5/00; H02K 5/20; H02K 5/203; H02K 5/207; H02K 5/24; H02K 5/26;
(Continued)

(56) References Cited

U.S. PATENT DOCUMENTS 5,758,999 A * 6/1998 Geise ................ B23Q 17/0976
408/124
5,853,159 A * 12/1998 Gorini ..................... H02K 5/24
310/91

(Continued)

FOREIGN PATENT DOCUMENTS

DE    19 15 896 A1    10/1970
DE    16 13413 A1    2/1972
(Continued)

OTHER PUBLICATIONS

"Combined Alternator End Frame and Engine Mounting Bracket", Research Disclosure, Kenneth Mason Publications, Hampshire, UK, GB, No. 304, Aug. 1, 1989, p. 620, See International Search.
(Continued)

*Primary Examiner* — Tran N Nguyen
(74) *Attorney, Agent, or Firm* — Finch & Maloney PLLC

(57) ABSTRACT

An electric motor (1), for a drive unit (2) of a drive train test bench, having a housing (3). The electric motor (1) is characterized in that the housing (3) has at least one yoke (4) for supporting the electric motor (1).

15 Claims, 2 Drawing Sheets

(51) Int. Cl.
    *G01M 13/025*     (2019.01)
    *F16C 37/00*     (2006.01)
    *H02K 5/24*     (2006.01)

(58) Field of Classification Search
    CPC .............. H02K 9/00; H02K 9/06; H02K 9/14; H02K 11/00; H02K 11/33; F16M 7/00; F16M 1/00; F16M 1/04
    USPC ................................ 310/89, 90, 91, 52–60 A
    See application file for complete search history.

(56) References Cited

U.S. PATENT DOCUMENTS

| | | | |
|---|---|---|---|
| 7,726,183 | B2 | 6/2010 | Erlach et al. |
| 10,088,033 | B2 | 10/2018 | Thelen |
| 2009/0250197 | A1* | 10/2009 | Hassett .............. F28D 15/0275 384/321 |
| 2015/0040654 | A1 | 2/2015 | Khateri |
| 2015/0054369 | A1* | 2/2015 | Ahlert ..................... H02K 5/26 310/91 |

FOREIGN PATENT DOCUMENTS

| | | |
|---|---|---|
| DE | 33 11 618 A1 | 10/1984 |
| DE | 43 28 537 A1 | 3/1995 |
| DE | 10 2007 040 106 A1 | 2/2009 |
| DE | 10 2008 062 181 B3 | 4/2010 |
| DE | 10 2009 020 182 A1 | 11/2010 |
| DE | 10 2010 055 573 A1 | 6/2012 |
| DE | 10 2012 018 359 A1 | 3/2013 |
| DE | 10 2012 007 576 A1 | 10/2013 |
| DE | 10 2015 101 885 A1 | 8/2016 |
| EP | 2 957 885 A1 | 12/2015 |
| GB | 2 327 817 A | 2/1999 |
| WO | 2005/116604 A1 | 12/2005 |

OTHER PUBLICATIONS

German Search Report Corresponding to 10 2016 224 138.9 dated Nov. 20, 2017.
German Search Report Corresponding to 10 2016 224 142.7 dated Aug. 3, 2017.
International Search Report Corresponding to PCT/EP2017/078529 dated Jan. 30, 2018.
International Search Report Corresponding to PCT/EP2017/078544 dated Mar. 26, 2018.
Written Opinion Corresponding to PCT/EP2017/078529 dated Jan. 30, 2018.
Written Opinion Corresponding to PCT/EP2017/078544 dated Mar. 26, 2018.
International Preliminary Report on Patentability Corresponding to PCT/EP2017/078529 dated Feb. 28, 2019.

\* cited by examiner

ELECTRIC MOTOR FOR A DRIVE UNIT OF A DRIVE TRAIN TEST BENCH

This application is a National Stage completion of PCT/EP2017/078529 filed Nov. 8, 2017, which claims priority from German patent application serial no. 10 2016 224 138.9 filed Dec. 5, 2016.

FIELD OF THE INVENTION

The invention concerns an electric motor or a drive unit of the drive train test bench.

BACKGROUND OF THE INVENTION

Transmission test benches or drive train test benches, respectively, for the testing of motor vehicle transmissions or complete motor vehicle drive trains, respectively, are known in the prior art. Such test benches are used, on one hand, to detect malfunctions in the drive train immediately after its production in the context of a so-called end-of-line test through a sequence of load tests. Typical malfunctions arise for instance with parts which have play, for instance gear wheels, synchronizer rings, synchronizer hubs, multi plate clutch disks and shafts, which can be deflected or even excited to vibrate. As part of the functional testing usually the acoustic behavior and the shift quality are tested. On the other hand, such test benches are also used in the development and continuous improvement of motor vehicle drive trains, as well as in particular with motor vehicle transmissions. Particular attention is usually paid here to the endurance strength as well as the basic development of new technical principles of action. Usually, such transmission test benches or drive train test benches, respectively, include an electric motor as the drive unit.

In this context, the DE 10 2012 018 359 A1 describes a drive cycle for a driving simulation, which is driven by a real motor vehicle on a roller test bench. The drive train of the motor vehicle gear hereby works in a way that the wheel rotational speed of a motor vehicle matches the respective predetermined speed of the drive cycle, without any real movement of the motor vehicle. This enables testing of the motor vehicle drive train after installation into the motor vehicle.

DE 43 28 537 C2 teaches a transmission test bench with a first servomotor, serving as the drive motor, and a second servomotor which serves as a brake motor. The first drive motor is connected by a clutch to the driveshaft of the motor vehicle which is to be tested and is here, in regard to its rotational speed, connected to a PC, whereby any desirable rotational speed patterns can be simulated. The brake motor is connected by another clutch with an output shaft of the motor vehicle transmission which is to be tested. The rotational speed of the second motor is also controlled through the PC. The simulated rotational speed patterns controlled by the PC are rotational speed patterns which had been measured in real drive tests. Thus, the motor vehicle transmission, in accordance with the DE 43 28 537 C2 can also be tested prior to installation in a motor vehicle.

GB 2 327 817 A teaches an electric motor for a fan. A housing of the electric motor has two mounting brackets which are positioned in the axially central area of the housing and extend substantially radially-laterally from the electric motor.

Under the title "Combined alternator end frame and engine mounting bracket", Research disclosure, Kenneth Mason Publications, Hampshire, UK, GB Nr. 304, 1 August 1989 (1989-08-91) page 620, XP000070145, ISSN: 0374-4353, an electric motor for motor vehicle applications is described, which has a mounting bracket at its axial end, facing the motor pinion, in the area of the front bearing. The mounting bracket extends radially-laterally from the electric motor.

From DE 19 15 896 A1 an electric machine is known in which the stand sheet metals are stamped in a way that the support structures or at least parts thereof are obtained from the same plate. The plate packet forms a housing of the electric motor.

However, the known drive train test benches have disadvantages because they are unsuitable for testing electric drive trains due to the electric motors which are used for their drive. The known types of electric motors used distinguish namely only between two types: the so-called base designed and the so-called flange design. Since speeds of more than 20,000 rpm are needed for testing electric drive trains, unilaterally flanged electric motors cannot be used due to insufficient stiffness. Due to the constant need to have output shafts of the tested parts with just little distance of axes, either below or on the side of the electric motor in the test bench during the tests of the electric drive trains, the use of the electric motors with the base design is eliminated.

SUMMARY OF THE INVENTION

It is an object of the present invention to propose an electric motor which is better suited for testing electric drive trains.

This object is achieved by the electric motor for a drive train unit of a drive train test bench according to the independent claim(s). Advantageous embodiments result from the dependent claims.

The invention relates to an electric motor for a drive unit of a drive train test bench, including a housing. The electric motor according to the invention is characterized by the fact that the housing has at least one yoke to support the electric motor.

Preferably, the drive train test bench is a drive train test bench for electric motor vehicle drives.

However, the electric motor according to the invention can also be used as a drive unit for drive train test benches designed for testing combustion-powered drive trains.

The inventive design of the electric motor has the advantage that the electric motor, and in particular a connection of the electric motor via the at least one yoke to the drive unit of the drive train test bench, is especially rigid. As a result, correspondingly high rotational speeds are made possible, without there being any disturbing test bench vibrations and disruptive intensities during the test sequence, while operating the drive train test bench. Since electric motor vehicle drives or their electric motor's output, respectively, provide rotational speeds of more than 20,000 rpm, which is considerably larger than the rotational speed spectrum of conventional combustion drives, special requirements exist regarding the stiffness and vibration damping of the connection of the electric motor to the drive unit for testing electric motor vehicle drives. A conventional drive unit of a drive train test bench for testing the electric motor vehicle drives would therefore also be unsuitable. The known electric motors used are usually either designed with a so-called base design or a so-called flange design. The one-sided flanged electric motors are not suitable for testing electric motor vehicle drives, due to their insufficient rigidity. Also, due to the constantly required necessity, when testing electric drive trains, to have the output shafts of the tested parts running with only little axial distance partially below or laterally of the electric motor, the use of electric motors with the base design is also eliminated.

The inventive electric motor, however, overcomes these disadvantages with the inventive design of the housing with at least one yoke, the electric motor can be supported by the at least one yoke, which provides an especially rigidity of the entire drive unit. In addition, the space below the electric motor or at the side of the electric motor, respectively, remains unused so that this space can be used as free space for passing an output shaft of the tested part.

The at least one yoke can be made preferably metallic and solid, in particular made of steel or a steel ahoy. Preferably as an alternative, the at least one yoke is made of aluminum or aluminum ahoy.

The drive unit preferably includes a base on which the electric motor is supported by the at least one yoke. This base is made preferably from the material Hydropol, which is well suited for vibration damping.

The connection of the yoke with the drive unit or rather the base of the drive unit can take place either horizontally or vertically. Meaning, that at least the one yoke can be connected either with the topside or rather the bottom side of the drive unit or the yoke, respectively, or also connected with a side receptacle of the drive unit or base, respectively. Also, combinations are hereby possible and preferred, in particular when the housing has more than just one yoke.

It is further preferred that the drive unit is designed such that a first resonant frequency of the drive unit is above of the first rotational order of the electric motor. At a motor rotational speed of 20,000 rpm, the resonant frequency of the drive unit should therefore be approximately 470 Hz. It has been proven as especially suitable for testing high-speed electric motor vehicle drives.

The inventive electric motor allows preferably in the same way a so-called active test, as well as a so-called passive test, the term active test being understood to mean a test of an electric motor vehicle drive with an electric drive motor, and the term passive test being understood to mean a test of an electric motor vehicle drive without an electric drive motor. A corresponding drive train test bench is therefore equally suitable for testing the transmission or the bearings of the electric motor vehicle drive, as well as for testing the electric drive of the electric motor vehicle drive.

Dependent on the design of the electric motor, it is preferably air cooled, or water cooled, or combined as air- and water-cooled.

In accordance with a preferred embodiment of the invention, it is provided that the at least one yoke is designed as one-piece with the housing. This results in the advantage that the connection of the at least one yoke with the housing of the electric motor can be designed especially rigid which enables further improved vibration damping and, consequently, a further improved accuracy of the test.

In accordance with an alternative, preferred embodiment of the invention, it is provided that the at least one yoke is screwed or welded to the housing. This represents an alternative to a one-piece housing design and leads to, when properly screwed or welded together, a nearly identical stiffness as a one-piece design. At the same time, however, the production cost of the housing of the electric motor is reduced.

In accordance with an additional, preferred embodiment of the invention, it is provided that the at least one yoke is designed as a transverse yoke, as a ring yoke, or as frame yoke. These designs have themselves proven equally as suitable and each allow a particularly rigid connection of the electric motor to the drive unit.

Most preferably, the housing has several different designs of yokes, for instance a transverse yoke and a frame yoke.

A transverse yoke is understood to mean a yoke whose yoke arms extend radially-laterally from the electric motor, A ring yoke is understood to mean an extended transverse yoke whose yoke arms are connected to each other at their yoke ends by longitudinal struts. The longitudinal struts and the yoke arms are preferably formed as one piece. This leads again to an additional, improved rigidity of the drive unit.

In a design of the yoke as a transverse yoke or as a ring yoke, the motor is preferably supported via the yoke ends of the yoke arms on the base of the drive unit. A frame yoke is understood to mean a yoke whose yoke arms pass into a yoke frame and completely surround the electric motor radially.

By using a frame yoke, the base of the drive unit can be simplified accordingly, because the electric motor can be supported directly on the base via the yoke frame. Especially preferred, one can hereby even completely omit the base.

In accordance with an additional, preferred embodiment of the invention, it is provided that the at least the one yoke has an additional longitudinal reinforcement. This additional longitudinal reinforcement is preferably designed as a longitudinal strut. Further preferably, it is not designed as one piece with the yoke arms, but added later to connect the yoke arms of each side to each other at their yoke ends. This also leads to an additional rigidity of the drive unit. Preferably, the additional longitudinal reinforcement is connected with the yoke arms by means of screws or by means of welding.

Advantageously, a plurality additional longitudinal stiffeners can be provided on each side, which are positioned either parallel or at predetermined angles to each other. Particularly preferably, the additional longitudinal stiffeners are positioned orthogonal to the yoke arms.

In accordance with an additional, preferred embodiment of the invention, it is provided that the at least one yoke has a fluid bearing cooling for at least one bearing of the electric motor. The fluid can be a gas, for instance air, or a liquid, for instance water or oil. Thus, the bearings can be cooled in a simple manner.

Since the at least one yoke is preferably solid and metallic, suitable channels for the fluid bearing cooling can be drilled in the at least one yoke to supply the fluid and remove it again.

In particular and in connection with the channels for the fluid bearing cooling, the production of at least one yoke by means of a 3D printing method has turned out to be especially advantageous. In this case, the channels can be especially easily created directly during the production of the yoke.

Alternatively preferred, it is also possible to produce the at least one yoke by casting, forging, or pressing, and to design the channels as bores.

In accordance with an additional, preferred embodiment of the invention it is provided, that the housing has a radial diameter of less than 270 mm. This results in the advantage that the electric motor is designed to be comparatively slim, in order to ensure as much free space under and to the side of the electric motor.

This favors in particular the testing of axially parallel constructed electric motor vehicle drives without additional angle gearing. In the case of electric motor vehicle drives constructed in an axially parallel manner, the output shaft is arranged outside of the electric drive, namely axially parallel to the motor shaft of the electric drive.

In accordance with an additional preferred embodiment of the invention it is provided that the electric motor is designed to reach rotational speeds of more than 25,000 rpm. Such rotational speeds corresponds to the rotational speeds which are generated during operation of an electric motor vehicle drive and its electric drive, meaning of its electric motor. Thus, a realistic test of the electric motor vehicle drive is made possible.

BRIEF DESCRIPTION OF THE DRAWINGS

The invention will be explained by way of example with reference to embodiments shown in the figures.

These show.

Figure 1:
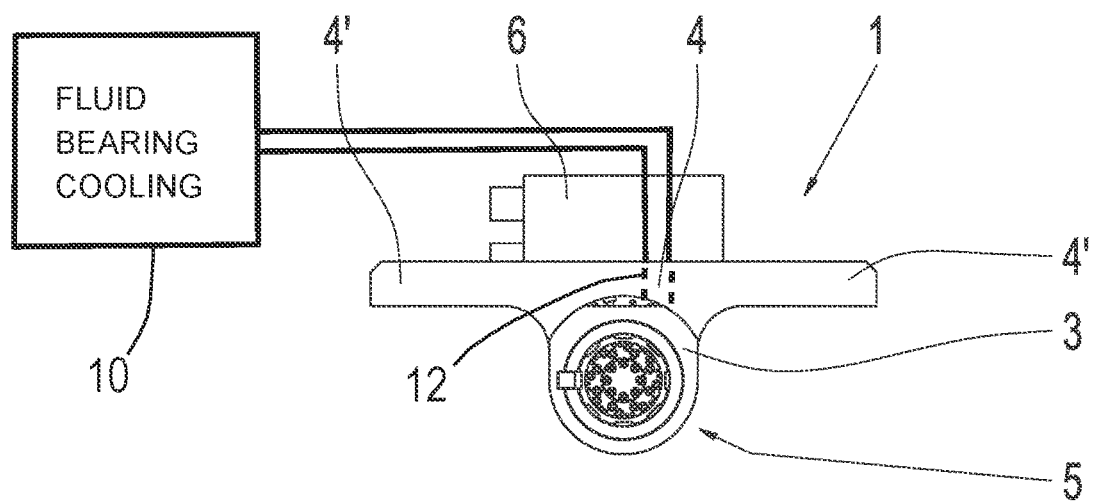
FIG. 1 an example and schematics of an electric motor,
FIG. 2 a oblique view of the electric motor shown in FIG. 1,
FIG. 3 a detail of an oblique view of the electric motor shown in FIG. 1,
FIG. 4 an example of a drive unit and
FIG. 5 an example of another possible embodiment of an electric motor.

DETAILED DESCRIPTION OF THE PREFERRED EMBODIMENTS identical objects, functional units, and comparable components are marked across all drawings with the same reference characters. These objects, functional units, and comparable components are identical in terms of their technical characteristics, unless the description explicitly or implicitly states otherwise.

FIG. 1 shows, by way of example and schematically, an electric motor 1 for a drive unit 2 (not shown in FIG. 1) of a drive train test bench. The electric motor 1 comprises a housing 3 which has a yoke 4 for supporting the electric motor 1. The yoke 4 has yoke arms 4', which extend radially-laterally from the electric motor 1. In accordance with the example, the yoke 4 is integrally formed with the housing 3 which results in an especially high rigidity and good vibration damping of the corresponding drive unit 2. With the shown design of the electric motor 1 or the housing 3, respectively, sufficient free space 5 remains underneath and on the side of the electric motor 1 in order to, for instance, pass an output shaft of an electric motor vehicle drive which needs to be tested, next to the electric motor 1. The electric motor 1 as shown in FIG. 1 further comprises a power connection 6 which can be connected with an external energy source and which feeds the electric motor 1 with electrical power. In accordance with the example, the electric motor 1 has a diameter of 260 mm and is designed to reach rotational speeds of up to 25,000 rpm rotating around rotational axis A.

Figure 2:
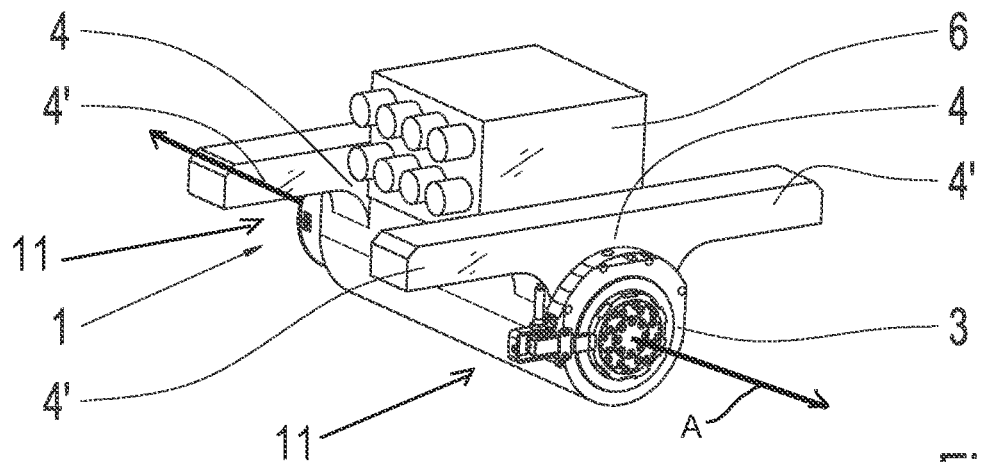

FIG. 2 shows an oblique view of the electric motor 1 shown in FIG. 1. As can be seen in FIG. 2, the housing 3 has a front yoke 4 and a rear yoke 4, whose yoke arms 4' extend radially-laterally from the electric motor 1. The front and the rear yoke 4 are axially distanced from each other and are each positioned in respective front and rear bearing areas 11 of the electric motor 1. This promotes efficient cooling of the bearings. The at least one yoke has a fluid bearing cooling 10 for cooling at least one bearing area 11 of the electric motor 1. The fluid can be a gas, for instance air, or a liquid, for instance water or oil. Thus, the bearing area 11 can be cooled in a simple manner. The at least one yoke 4 is preferably solid and metallic, such that suitable channels 12 (diagrammatically shown in FIG. 1 as dashed lines) for the fluid bearing cooling can be drilled in the at least one yoke 4 to supply the fluid and remove it again.

Figure 3:
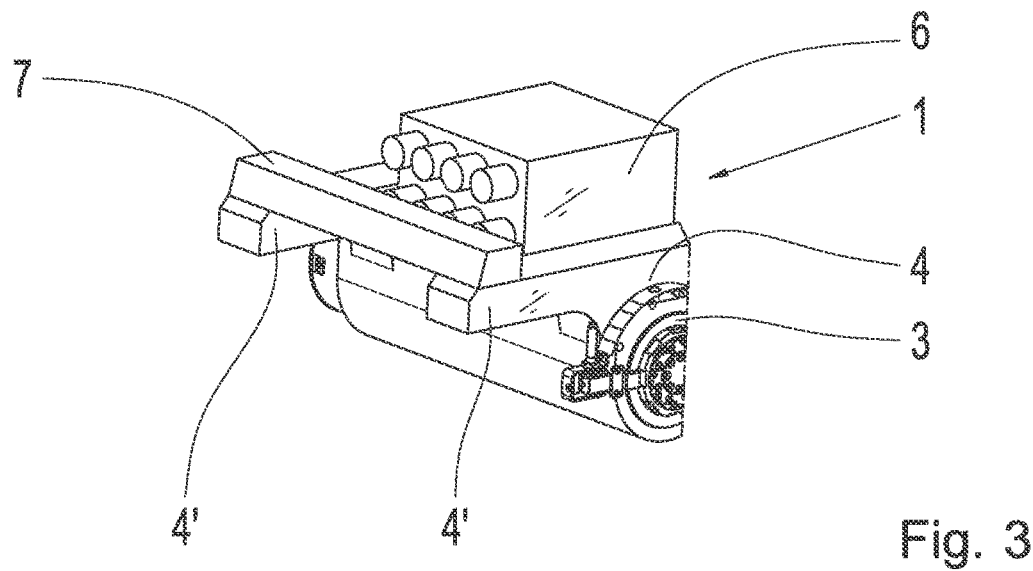

FIG. 3 shows a detail of the oblique view of the electric motor 1 as shown in FIG. 1, however, the yoke arms 4' are connected with each other at their yoke ends by a longitudinal strut 7, designed as an additional longitudinal reinforcement 7. In accordance with the example, the additional longitudinal reinforcement 7 is connected with the yoke arms 4' by means of a screw connection. This leads to a further increase in rigidity and a further improvement in the vibration damping.

Figure 4:
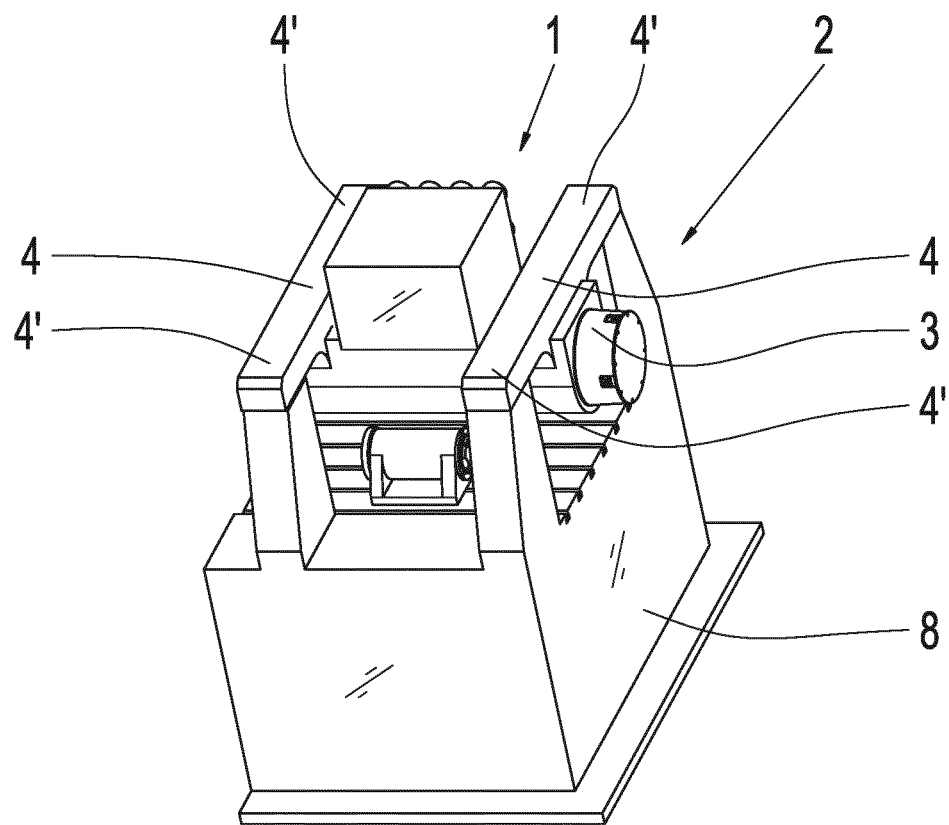

FIG. 4 shows by way of example a drive unit 2 which has the electric motor 1 as described in FIG. 1. The electric motor 1 is supported via the front and rear yoke 4, or via the yoke ends of the yoke arms 4', horizontally on a base 8 of the drive unit 2. The drive unit 2 shown by way of example in FIG. 4 therefore comprises the electric motor 1 and the base 8. The base is made, for example, of the material Hydropol, which is very well suited for vibration damping.

Figure 5:
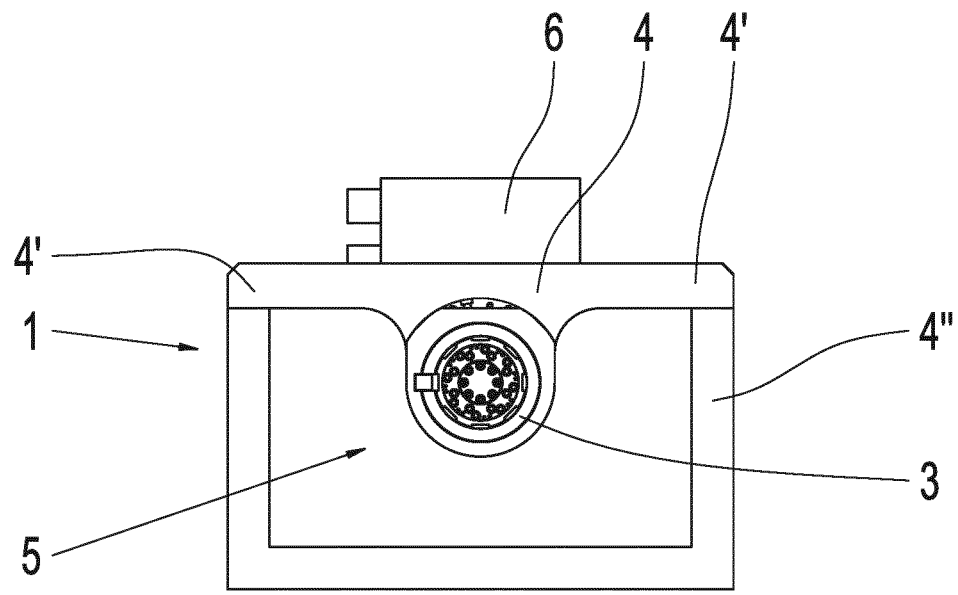

FIG. 5 shows by way of example a further possible embodiment of an electric motor 1, wherein the housing 3 in this case has a yoke 4 which is designed as a frame yoke 4. In the shown frame yoke 4, the yoke arms 4' merge into a yoke frame 4", such that the electric motor 1 is radially completely enclosed. Within the yoke frame 4" there is sufficient free space 5 to pass an output shaft of an electric motor vehicle drive to be tested past the electric motor 1.

REFERENCE CHARACTERS

1 Electromotor
2 Drive Unit
3 Housing
4 Yoke
4' Yoke Arm
4' Yoke Frame
5 Free Space
6 Power Connection
7 Longitudinal Strut, Longitudinal Bar
8 Base

The invention claimed is:

1. An electric motor in combination with a drive unit of a drive train test bench, the electric motor comprising:
a housing having at least a front yoke and a rear yoke for supporting the electric motor on the drive unit,
each of the front yoke and the rear yoke having a pair of yoke arms spaced radially from and extending laterally with respect to a rotational axis of the electric motor,
the front yoke and the rear yoke being axially spaced apart from each other along the rotational axis and each of the front and the rear yokes being positioned in a respective bearing area of the electric motor,
the front yoke and the rear yoke each having fluid bearing cooling for cooling the respective bearing areas of the electric motor,
the pair of yoke arms of the front yoke and the rear yoke each has a free end that are laterally opposite each other, and the free ends of the pair of yoke arms of the front yoke and the rear yoke are rigidly connected to the drive unit to facilitate supporting the electric motor and the housing on the drive unit such that the electric motor is separated from the drive unit by a free space formed below and laterally beside the electric motor and between the electric motor and the drive unit, the free space facilitating passage of an output shaft of a part to be tested, and the electric motor being designed to achieve speeds in excess of 25,000 rpm.

2. The electric motor according to claim 1, wherein at least one of the front yoke and the rear yoke is designed integrally with the housing.

3. The electric motor according to claim 1, wherein at least one of the front yoke and the rear yoke is either screwed or welded to the housing.

4. The electric motor according to claim 1, wherein at least one of the front yoke and the rear yoke is designed as one of a transverse yoke, a ring yoke and a frame yoke.

5. The electric motor according to claim 1, wherein the free end of at least one of the pair of yoke arms of the front yoke and the rear yoke are rigidly connected to opposite axial ends of an additional longitudinal reinforcement.

6. The electric motor according to claim 1, wherein the electric motor has both the front yoke and the rear yoke and a longitudinal reinforcement which rigidly connects the front yoke to the rear yoke.

7. The electric motor according to claim 1, wherein the housing has a radial diameter of less than 10.63 inches (270 mm).

8. The electric motor according to claim 1, wherein at least one of the front yoke and the rear yoke is made of metal.

9. The electric motor according to claim 8, wherein the metal is one of steel, a steel alloy, aluminum or an aluminum alloy.

10. The electric motor according to claim 1, wherein the electric motor is mounted on a base of the drive unit solely by the free ends of the pair of yoke arms of the front yoke and the rear yoke.

11. The electric motor according to claim 10, wherein the base is made from a vibration damping material.

12. The electric motor according to claim 1, wherein the electric motor includes a power connection for supplying electrical power to the electric motor.

13. The electric motor according to claim 1, wherein:
the free ends of the pair of yoke arms of the front yoke extend laterally away from one another relative to the rotational axis of the electric motor,
the free ends of the pair of yoke arms of the rear yoke extend laterally away from one another relative to the rotational axis of the electric motor, and
the pair of yoke arms of the front yoke extend parallel to the pair of yoke arms of the rear yoke.

14. An electric motor in combination with a drive unit of a drive train test bench, the electric motor comprising:
a housing having at least a front yoke and a rear yoke which support the electric motor on the drive unit such that the electric motor is positioned above the drive unit and separated therefrom by a free space,
each of the front yoke and the rear yoke having a pair of yoke arms which are spaced radially from and extending laterally with respect to a rotational axis of the electric motor, the electric motor being supported below the front and the rear yokes,
the front yoke and the rear yoke being axially spaced apart from each other and each being positioned in a respective bearing area of the electric motor,
the front yoke and the rear yoke each having fluid bearing cooling for cooling the respective bearing areas of the electric motor,
free ends of the pair of yoke arms of each of the front yoke and the rear yoke are connected to the drive unit to rigidly fix the electric motor and the housing to the drive unit, while the front and the rear yokes separate the electric motor from the drive unit so that further free space is formed laterally beside the electric motor, the free space and the further free space remains unused and facilitates passage an output shaft of a part to be tested, and
the electric motor being designed to achieve speeds in excess of 25,000 rpm.

15. An electric motor in combination with a drive unit of a drive train test bench, the electric motor comprising:
a housing having at least a front yoke and a rear yoke which support the electric motor on the drive unit,
a power connection for supplying electrical power to the electric motor,
each of the front yoke and the rear yoke having a pair of yoke arms which are spaced radially from and extending laterally with respect to a rotational axis of the electric motor,
the front yoke and the rear yoke being axially spaced apart from each other and each being positioned in a bearing area of the electric motor,
the front yoke and the rear yoke each having fluid bearing cooling for cooling the bearing areas of the electric motor,
free ends of the pair of yoke arms of each of the front yoke and the rear yoke are rigidly connected to the drive unit to immovably fix the electric motor and the housing to the drive unit, and the front and the rear yokes space the electric motor from the drive unit so that space to the lateral sides and below the electric motor and between the electric motor and the drive unit remains unused and facilitates passage an output shaft of a part to be tested,
the free ends of the pair of yoke arms of the front yoke extend away from one another, the free ends of the pair of yoke arms of the rear yoke extend away from one another, and the pair of yoke arms of the front yoke extend parallel to the pair of yoke arms of the rear yoke, and
the electric motor being designed to achieve speeds in excess of 25,000 rpm.

* * * * *